Nov. 6, 1928. 1,690,745
O. MICKELSON
CHOKER HOOK
Filed Aug. 17, 1927
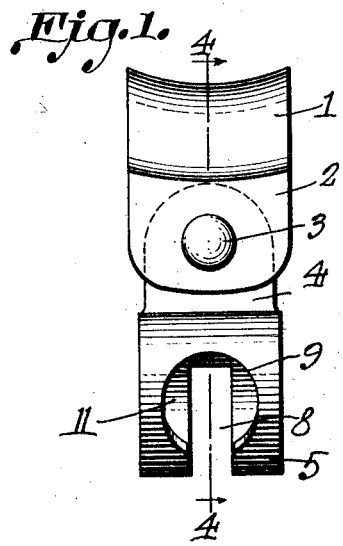
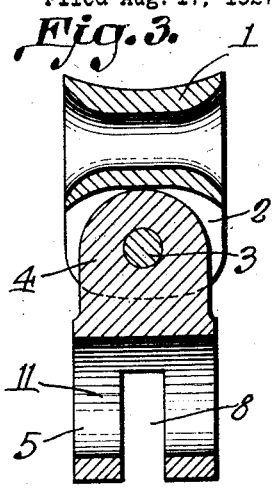
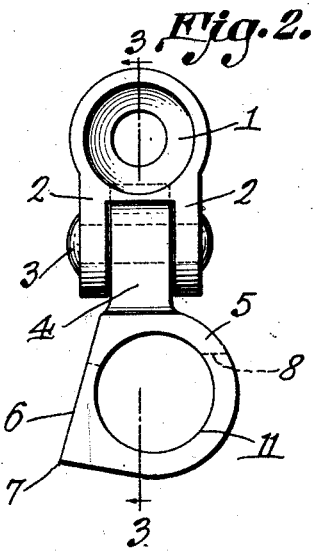
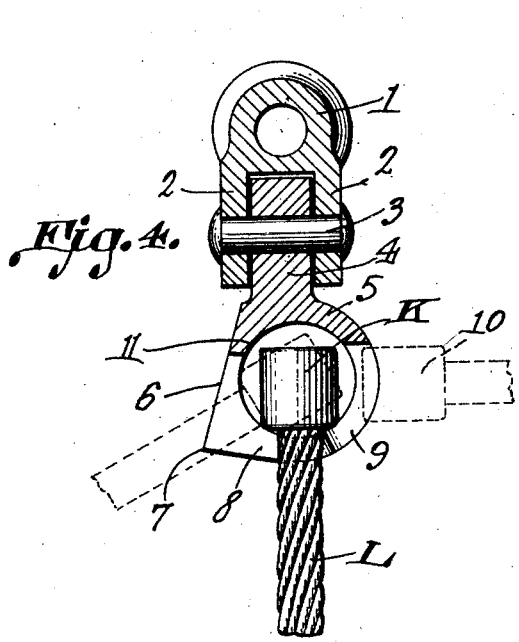
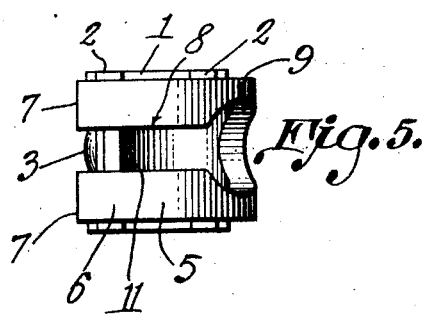
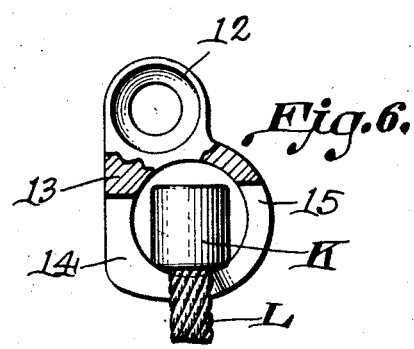
Ole Mickelson Inventor
By C. A. Snow & Co.
Attorneys Patented Nov. 6, 1928.

1,690,745

UNITED STATES PATENT OFFICE.

OLE MICKELSON, OF HOQUIAM, WASHINGTON.

CHOKER HOOK.

Application filed August 17, 1927. Serial No. 213,607.

This invention relates to choker hooks such as used by loggers wherein a choker line may be swiveled and to which the line can be easily connected.

Heretofore in devices of this character the line has necessarily been bent abruptly at one of its points of contact with the choker hook while in use and after a comparatively short period of use the strands of the line become broken due to the constant bending and wearing action at one point.

It is an object of the present invention to provide a choker hook the construction of which is such as to eliminate this objectionable feature by permitting the line to have an extensive swinging movement relative to the hook without causing it to bend against a portion of the hook.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a side elevation of a choker hook embodying the present improvements.

Figure 2 is an end view thereof.

Figure 3 is a section on line 3—3, Figure 2.

Figure 4 is a section on line 4—4, Figure 1, the choker cable being indicated in position therein by full lines, two other positions thereof being indicated by broken lines.

Figure 5 is a bottom plan view of the choker hook.

Figure 6 is a view partly in side elevation and partly in section of a slightly modified form of hook.

Referring to the figures by characters of reference 1 designates a sleeve having flared ends adapted to receive a line and extending from this sleeve are spaced ears 2 connected by a pivot pin 3. On this pivot pin is mounted an ear 4 projecting from the body 5 of the hook. This body, in the form shown, is in the form of a tubular member of any suitable configuration and, if desired, provided with flat faces 6 converging to form a nose 7. A peripheral slot 8 is formed in this member 5 and extends through approximately 270°, the ends of the slot being substantially equally spaced from the ear 4. The width of the slot is slightly greater than the diameter of the line L to be used in connection with the hook and one end of the slot is enlarged to provide an opening 9 of such size as to receive the knob K on the end of the line L when said knob is inserted end first as shown by broken lines at 10 in Figure 4. The opening extending longitudinally through the tubular member 5 is of a diameter greater than the length of the knob K as shown at 11 in Figure 4.

In practice the parts are assembled by inserting the knob K end first through the opening 9 until it enters the opening 11. The knob is then shifted away from the opening 9 by swinging the line L into the slot 8. An intermediate position of the line relative to the member 5 has been shown in Figure 4. Obviously, however, this line can swing through approximately 90° in either direction from this intermediate position without coming into contact with either end wall of the slot 8. Therefore the danger of bending and breaking the strands of the line as the result of constant use is practically eliminated and the line will last much longer than is the case where other types of hooks are employed.

It is to be understood that various kinds of hooks can be employed within the scope of the present invention, it being essential in every case that the line receiving slot be extended through approximately 270° to allow the desirable free swinging movement of the parts relative to each other. Furthermore instead of making the hook in two parts as shown in Figures 1 to 4 inclusive wherein a sleeve is pivotally connected to the body portion of the hook, said body portion can be made integral with the sleeve as shown in Figure 6. In this structure the sleeve has been indicated at 12 and is made integral with the body portion 13 of the hook and this body portion has the line receiving slot 14 extending within the wall thereof through approximately 270°, the said slot being of substantially the same shape as that heretofore described, it being provided with an enlargement 15 at one end to receive the knob K on the line L. Various other changes can be made in the construction and arrangement of parts within the scope of the claims.

Although the improvements have been shown combined with a choker hook it is to be understood that they can also be used with hooks and other structures of a similar nature.

What is claimed is:

1. A choker hook including a tubular body open at opposite ends and having a line receiving slot in the wall thereof between the ends extending through more than 180°, one end of the slot being enlarged for the reception of the knob of a line.

2. A choker hook including a tubular body portion open at its ends and having a line receiving slot in the wall thereof between the ends extending through more than 180°, one end of the slot being enlarged to receive the knob of a line, and a sleeve upon the body portion of the hook.

3. A choker hook including a body portion having a cylindrical opening extending therethrough and a slot in the wall of the body portion between the exposed ends of the opening extending through more than 180°, one end of the slot being enlarged to receive the knob of a line when inserted endwise into the body portion, the cylindrical opening in the body portion being of a diameter greater than the greatest dimension of the knob.

4. A choker hook including a body portion having an opening extending transversely therethrough and a slot in the wall of the body portion between the ends of the opening extending through more than 180°, one end of the slot being enlarged to receive the knob of a line when inserted endwise into the body portion, the opening in the body portion being of a diameter greater than the greatest dimension of the knob, and a line receiving sleeve upon the body portion.

5. A choker hook including a body portion having an opening extending transversely therethrough and exposed at the sides of the body portion, there being a slot within the wall of the body portion between the exposed ends of the opening for the reception of a line, one end of the slot being enlarged to receive the knob of the line, said slot being of such length as to permit an engaged line to swing through approximately 180° relative to the body portion without contacting with the end walls of the slot.

In testimony that I claim the foregoing as my own, I have hereto affixed my signature.

OLE MICKELSON.